US012706515B2

(12) United States Patent
Wang

(10) Patent No.: US 12,706,515 B2
(45) Date of Patent: Aug. 11, 2026

(54) POWER SUPPLY SYSTEM AND ELECTRIC VEHICLE

(71) Applicant: CONTEMPORARY AMPEREX TECHNOLOGY (HONG KONG) LIMITED, Hong Kong (CN)

(72) Inventor: Shaodong Wang, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 760 days.

(21) Appl. No.: 18/085,499

(22) Filed: Dec. 20, 2022

(65) Prior Publication Data

US 2023/0219430 A1 Jul. 13, 2023

Related U.S. Application Data

(63) Continuation of application No. PCT/CN2022/090862, filed on May 5, 2022.

(30) Foreign Application Priority Data

Jan. 10, 2022 (CN) ......................... 202210022389.4

(51) Int. Cl.
*H02M 1/00* (2007.01)
*B60L 3/00* (2019.01)
(Continued)

(52) U.S. Cl.
CPC ......... *H02M 1/0009* (2021.05); *B60L 3/0046* (2013.01); *B60L 50/60* (2019.02); *H02M 3/156* (2013.01); *B60L 2210/10* (2013.01)

(58) Field of Classification Search
CPC ... H02M 1/0009; H02M 3/156; B60L 3/0046; B60L 50/60; B60L 2210/10;
(Continued)

(56) References Cited

U.S. PATENT DOCUMENTS

2008/0315683 A1 12/2008 Jabaji et al.
2014/0081509 A1 3/2014 Koch et al.
(Continued)

FOREIGN PATENT DOCUMENTS

CN 203611778 U 5/2014
CN 107031411 A 8/2017
(Continued)

OTHER PUBLICATIONS

English Translation of CN 112078366 (Year: 2020).*
(Continued)

*Primary Examiner* — Lincoln D Donovan
*Assistant Examiner* — Alex W Lam
(74) *Attorney, Agent, or Firm* — ANOVA LAW GROUP, PLLC

(57) ABSTRACT

Embodiments of the present disclosure provide a power supply system. The power supply system comprises a first loop and a second loop. The first loop includes a DC-DC conversion module connected in parallel to a first load, and each first terminal of the DC-DC conversion module and the first load that are connected in parallel is grounded. The second loop includes a storage battery connected in parallel to a second load, and each first terminal of the storage battery and the second load that are connected in parallel is grounded. The power supply system further includes a switch unit. The switch unit includes a switch. The switch is coupled in series between a second terminal of each of the DC-DC conversion module and the first load that are connected in parallel and a second terminal of each of the storage battery and the second load that are connected in parallel. The switch is in an on-state by default, so that a vehicle is started by using the storage battery in the second loop.

12 Claims, 2 Drawing Sheets

(51) Int. Cl.
*B60L 50/60* (2019.01)
*H02M 3/156* (2006.01)

(58) Field of Classification Search
CPC ...... B60L 2240/36; B60L 3/04; B60L 3/0092; B60R 16/0232; H02J 7/00; H02J 1/00; H02J 7/00304; H02J 7/00308; H02J 7/00309; H02J 7/0031; B60Y 2200/91; Y02T 10/70; Y02T 10/72
See application file for complete search history.

(56) References Cited

U.S. PATENT DOCUMENTS

| | | | | |
|---|---|---|---|---|
| 2015/0314740 | A1 | 11/2015 | Reichow et al. | |
| 2019/0359081 | A1 | 11/2019 | Erhart et al. | |
| 2020/0216002 | A1 | 7/2020 | Mazaki et al. | |
| 2020/0217899 | A1 | 7/2020 | Fan et al. | |
| 2024/0302441 | A1* | 9/2024 | Morita | H02J 7/00 |

FOREIGN PATENT DOCUMENTS

| | | | | |
|---|---|---|---|---|
| CN | 112009246 | A | 12/2020 | |
| CN | 112078366 | A * | 12/2020 | H02H 3/08 |
| FR | 3097184 | A1 | 12/2020 | |
| JP | 2015074348 | A | 4/2015 | |
| JP | 2017175708 | A | 9/2017 | |
| JP | 2019062727 | A | 4/2019 | |
| JP | 2021164189 | A | 10/2021 | |
| JP | 2021180550 | A | 11/2021 | |
| KR | 20000039009 | A | 7/2000 | |
| WO | 2021230129 | A1 | 11/2021 | |

OTHER PUBLICATIONS

The Japan Patent Office (JPO) Notification of Reasons for Refusal for Application No. 2022-562321 and Translation Feb. 27, 2024 8 Pages.
The Japan Patent Office (JPO) Decision to Grant a Patent for Application No. 2022-562321 Aug. 6, 2024 6 Pages (including translation).
Korean Intellectual Property Office (KIPO) Office Action 1 for Application No. 10-2023-7008277 Aug. 16, 2024 12 Pages (including translation).
Contemporary Amperex Technology Co., Limited, PCT/CN2022/090862, International Search Report and Written Opinion, Jan. 10, 2022, 5 pgs.
The European Patent Office (EPO) The Extended European Search Report for 22782807.6 Aug. 23, 2023 7 Pages.
State Intellectual Property Office of China The First Examination Opinion Notice for Application No. 202210022389.4 May 31, 2025 18 pages (including translation).

* cited by examiner

POWER SUPPLY SYSTEM AND ELECTRIC VEHICLE

CROSS-REFERENCE TO RELATED APPLICATIONS

This application is a continuation application of PCT Patent Application No. PCT/CN2022/090862, entitled "POWER SUPPLY SYSTEM AND ELECTRIC VEHICLE" filed on May 5, 2022, which claims priority to Chinese Patent Application No. 202210022389.4, filed with the State Intellectual Property Office of the People's Republic of China on Jan. 10, 2022, and entitled "POWER SUPPLY SYSTEM AND ELECTRIC VEHICLE", all of which are incorporated herein by reference in their entirety.

TECHNICAL FIELD

The present disclosure relates to the field of power supply technologies, and in particular, to a power supply system and an electric vehicle.

BACKGROUND

With the continuous improvement of living standards, automobiles have become an indispensable part of people's daily travel. Energy saving and emission reduction is the key to the sustainable development of the automobile industry. Electric vehicles have gradually become an important part of the sustainable development of the automobile industry due to their advantages of energy saving and environmental protection. Safety of automobiles has always been a subject of great concern to people. A power supply system is an important factor in ensuring vehicle safety. For an electric vehicle, the power supply system is particularly critical. A reliable and stable power supply system is a key to ensuring safety of a vehicle (especially for an electric vehicle).

SUMMARY

In view of the foregoing problem, the present disclosure provides a double-loop power supply system and an electric vehicle with a double-loop power supply system.

According to a first aspect, the present disclosure provides a power supply system, including: a first loop, where the first loop includes a DC-DC conversion module connected in parallel to a first load, and each first terminal of the DC-DC conversion module and the first load that are connected in parallel is grounded; a second loop, where the second loop includes a storage battery connected in parallel to a second load, and each first terminal of the storage battery and the second load that are connected in parallel is grounded; and a switch unit, where the switch unit includes a switch, the switch is coupled in series between a second terminal of each of the DC-DC conversion module and the first load that are connected in parallel and a second terminal of each of the storage battery and the second load that are connected in parallel, and the switch is in an on-state by default.

In the technical solution of an embodiment of the present disclosure, only one storage battery is used to implement the dual-circuit power supply system. In such a power supply system, when one loop fails, the other loop is used to supply power, so that a vehicle can continue to drive or perform an emergency safety operation, significantly improving vehicle safety. In such a power supply system, the switch is in an on-state by default, so that the vehicle can be started by using the storage battery in the second loop as a starting power supply.

Such a design is implemented by improving an original vehicle single power supply system, without adding additional storage battery or another component, so that no additional costs is added, and a structure is simple. In addition, such a design does not have an impact on a weight and the like of the vehicle, or cause a problem such as subsequent vehicle tuning.

In some embodiments, the switch unit further includes a control module and a sensor. The control module is configured to: in response to receiving a sensing signal from the sensor, send a control signal to the switch. The sensor may detect various parameters in the power supply system. The control module may control the switch in the switch unit based on the various parameters detected by the sensor, to cope with various cases that may occur when the power supply system fails.

In some embodiments, the sensor may include a current sensor, where the current sensor is coupled in series to the switch. The control module is further configured to: receive a current value from the current sensor, and send a turn-off signal to the switch in response to determining that the received current value is greater than a current threshold. The current sensor is coupled in series with the switch, and may measure a current value flowing between the first loop and the second loop, so as to detect an operating state of the first loop and the second loop. The control module may determine the operating state of the two loops in the power supply system based on the current value between the first loop and the second loop measured by the current sensor, and control the switch to be turned off when it is determined that the current value is greater than the current threshold, so that one loop in the power supply system can continue to work normally, and the vehicle can continue to drive or perform an emergency operation with the help of the remaining loop.

In some embodiments, the sensor may include a voltage sensor, where the voltage sensor is coupled in parallel to the switch. The control module is further configured to: receive a voltage value from the voltage sensor, and send a turn-off signal to the switch in response to determining that the received voltage value is greater than a voltage threshold. The voltage sensor is coupled in parallel with the switch, and may measure a voltage value across the switch (namely, between the first loop and the second loop), so as to detect an operating state of the first loop and the second loop. The control module may determine the operating state of the two loops in the power supply system based on the voltage value between the first loop and the second loop measured by the voltage sensor, and control the switch to be turned off when it is determined that the voltage value is greater than the voltage threshold, so that one loop in the power supply system can continue to work normally, and the vehicle can continue to drive or perform an emergency operation with the help of the remaining loop.

In some embodiments, the switch unit may further includes a timer, and the timer is coupled to the control module. The control module may be further configured to start the timer upon determining that the received voltage value is greater than the voltage threshold. When the control module determines that the received voltage value is greater than the voltage threshold for a duration that is greater than a duration threshold, a turn-off signal is sent to the switch. When the control module determines that the received voltage value is greater than the voltage threshold for a duration that is less than the duration threshold, no processing is performed. The use of a timer may prevent the control module from turning off the switch at a moment of startup of a high-power device during normal operation of the power supply system.

In some embodiments, the control module may be configured to: after sending the turn-off signal to the switch, report to a vehicle controller that the switch is in turned off. The control module may report a state of the switch and/or a state of the power supply system to the vehicle controller, so that the vehicle controller can perform a corresponding operation based on the report.

In some embodiments, the sensor may include a temperature sensor, where the temperature sensor is coupled in series to the switch. The control module may be configured to receive a temperature value from the temperature sensor, and determine that the switch is disabled in response to determining that the received temperature value is greater than a temperature threshold. The temperature sensor is coupled in series to the switch, and may measure the temperature value of the switch unit (or the switch) for detecting a state of the switch unit (or switch). The control module may determine, based on the temperature of the switch unit (or switch) measured by the temperature sensor, whether the state of the switch is a normal state or a failure state.

In some embodiments, the control module may be configured to: after a signal that the switch is disabled is determined, report to a vehicle controller that the switch is disabled. The control module may report to the vehicle controller whether the switch is disabled, so that the vehicle controller can perform a corresponding operation based on the report.

According to a second aspect, the present disclosure provides an electric vehicle, which may include the power supply system in the foregoing embodiments.

In some embodiments, the electric vehicle may include a vehicle controller, and the vehicle controller may be configured to exit an automatic driving mode in response to receiving, from a control module, a signal that the switch is turned off or a signal that the switch is disabled. The vehicle controller may obtain a switch status signal from the control module, and perform a corresponding operation based on the switch status signal to ensure safety of vehicle driving.

The foregoing description is merely a summary of the technical solution of the present disclosure. In order to make the technical means of the present disclosure to be understood more clearly and implemented in accordance with the content of the specification, and in order to make the above and other objectives, features and advantages of the present disclosure more obvious and easier to understand, specific implementations of the present disclosure are described below.

BRIEF DESCRIPTION OF DRAWINGS

For a person of ordinary skill in the art, various other advantages and benefits will become clearer by reading detailed descriptions of the following optional implementations. The accompanying drawings are merely used for illustrating the optional implementations, and are not considered as a limitation on the present disclosure. Throughout the accompanying drawings, a same reference symbol is used to indicate a same part.

Figure 1:
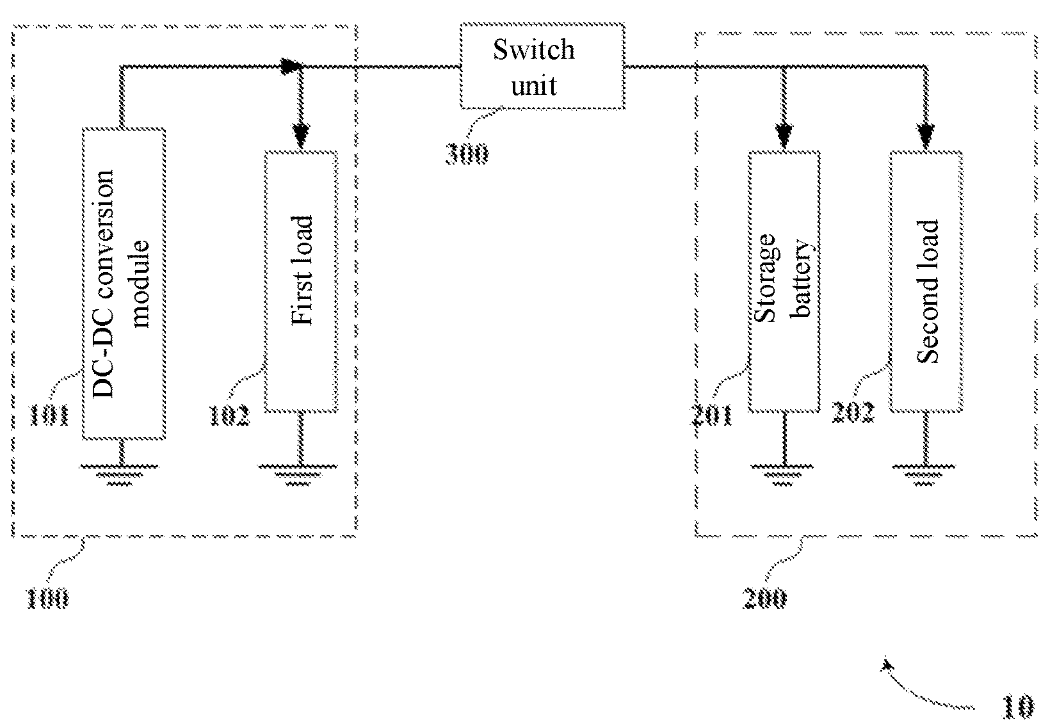
FIG. 1 is a schematic structural diagram of a power supply system according to an embodiment of the present disclosure.

In the accompanying drawings, the drawings are not drawn to actual scales.

Reference numerals in the drawings are as follows:

10. power supply system;

100. first loop; 101. DC-DC conversion module; 102. first load;

200. second loop; 201. storage battery; 202. second load; and

300. switch unit; 301. switch; 302. control module; 303. current sensor; 304. voltage sensor; 305. temperature sensor.

DETAILED DESCRIPTION

The following further describes implementations of the present disclosure in detail with reference to the accompanying drawings and embodiments. The detailed description and drawings of the following embodiments are used to exemplarily illustrate the principles of the present disclosure, but cannot be used to limit the scope of the present disclosure, that is, the present disclosure is not limited to the described embodiments.

In the description of the embodiments of the present disclosure, it should be noted that, unless otherwise specified, the term "a plurality of" means two or more; the term "and/or" describes only an association relationship for describing associated objects and represents that three relationships may exist. For example, A and/or B may represent the following three cases: only A exists, both A and B exist, and only B exists. In addition, the character "/" in the present disclosure generally indicates an "or" relationship between the associated objects. Moreover, the terms such as "first", "second", and "third" are used only for description and are not intended to indicate or imply relative importance.

Unless otherwise defined, all technical and scientific terms used in the present disclosure have the same meaning as that commonly understood by a person skilled in the art of the present disclosure. The terms used in the present disclosure are only for the purpose of describing specific embodiments and are not intended to limit the present disclosure. The terms "comprise" and "have" and any other variants thereof in the specification and claims of the present disclosure are intended to cover the non-exclusive inclusion.

The "embodiment" mentioned in the present disclosure means that a specific feature, structure, or characteristic described in combination with the embodiment may be included in at least one embodiment of the present disclosure. The appearance of the term in various places in the specification is not necessarily all referring to a same embodiment, nor is it a separate or alternative embodiment that is mutually exclusive with other embodiments. It may be explicitly or implicitly appreciated by those skilled in the art that the embodiments described in the present disclosure may be combined with other embodiments.

In the following descriptions, many specific details (such as examples of a specific component, circuit, and process) are provided to thoroughly understand the present disclosure. As used in the present disclosure, the terms "coupled", "coupling", "connected", or "connecting" mean directly connected to, or connected through one or more intervening media or components. For those of ordinary skill in the art, specific meanings of the foregoing terms in the present disclosure may be understood according to specific circumstances. In addition, in the description below and for purposes of explanation, many specific names are illustrated to provide a comprehensive understanding of the embodiments of the present disclosure. However, it is apparent to those skilled in the art that example embodiments may be practiced without these specific details. In other examples, well-known circuits and devices are shown in block diagram form in order to avoid obscuring the present disclosure.

With the continuous improvement of living standards, automobiles have become an indispensable part of people's daily travel. Energy saving and emission reduction is the key to the sustainable development of the automobile industry. Electric vehicles have gradually become an important part of the sustainable development of the automobile industry due to their advantages of energy saving and environmental protection. Safety of automobiles has always been a subject of great concern to people. A power supply system is an important factor in ensuring vehicle safety. For an electric vehicle, the power supply system is particularly critical. A reliable and stable power supply system is a key to ensuring safety of a vehicle (especially for an electric vehicle).

Currently, the power supply system of many automobiles uses a single-loop power supply system. When a single-loop power supply system of a vehicle fails, an electric load of the whole vehicle cannot work normally, which affects normal driving of the vehicle. When a power failure occurs while the vehicle is running, safety of the vehicle or passengers in the vehicle may also be affected. In addition, with the rapid advancement of science and technology, autonomous vehicles are slowly entering people's field of vision. Although fully autonomous vehicles are not yet widespread, vehicles with partially autonomous capabilities are already entering the market. Undoubtedly, autonomous driving has put forward a new requirement for safety of a vehicle. When the vehicle is in automatic driving mode, if a single-loop power supply system of the vehicle fails, an automatic driving system cannot work normally, and the vehicle in automatic driving mode is in danger of losing control. Moreover, when the single-loop power supply system of the vehicle fails, a safety module (such as a body stability control system ESC, and an electric power steering EPS) of the vehicle also fails.

In view of the foregoing problem, the present disclosure provides a power supply system and an electric vehicle. The power supply system of the present disclosure may include: a first loop, where the first loop includes a DC-DC conversion module connected in parallel to a first load, and each first terminal of the DC-DC conversion module and the first load that are connected in parallel is grounded; a second loop, where the second loop includes a storage battery connected in parallel to a second load, and each first terminal of the storage battery and the second load that are connected in parallel is grounded; and a switch unit, where the switch unit includes a switch, the switch is coupled in series between a second terminal of each of the DC-DC conversion module and the first load that are connected in parallel and a second terminal of each of the storage battery and the second load that are connected in parallel. The switch is in an on-state by default, so that a vehicle is started by using the storage battery in the second loop.

The power supply system of the present disclosure uses only one storage battery to form a dual-circuit power supply network. In such a power supply system, when one loop fails, the other loop can be used to supply power, so that a vehicle can continue to drive or perform a corresponding emergency operation (such as reducing a driving speed, emergency actuation, or pulling over), significantly improving vehicle safety. Such a power supply system is implemented by improving an original single-loop power supply network, without adding additional storage battery or another component, so that no additional costs is added, and a structure is simple. In addition, such a design does not have an impact on a weight and the like of the vehicle, or cause a problem such as subsequent vehicle tuning.

The power supply system of the present disclosure may be used for, but not limited to, a vehicle, a ship, or an aircraft. For ease of description, a vehicle is used as an example for description below; however, those skilled in the art will appreciate that the power supply system of the present disclosure may alternatively be applied to another vehicle with an electrical load (such as a ship or an aircraft). The use of the power supply system disclosed in the present disclosure can provide a backup power supply loop for the vehicle, which significantly improves safety of the vehicle (especially during driving).

The electric vehicle including the foregoing power supply system disclosed in the embodiment of the present disclosure may be, but not limited to, a pure electric vehicle, a hybrid electric vehicle, an extended-range vehicle, or the like. The power supply system disclosed in the present disclosure can use another loop to supply power when a single loop of the power supply system fails, and safety is significantly improved.

According to some embodiments of the present disclosure, the present disclosure provides a power supply system 10.

Figure 2:
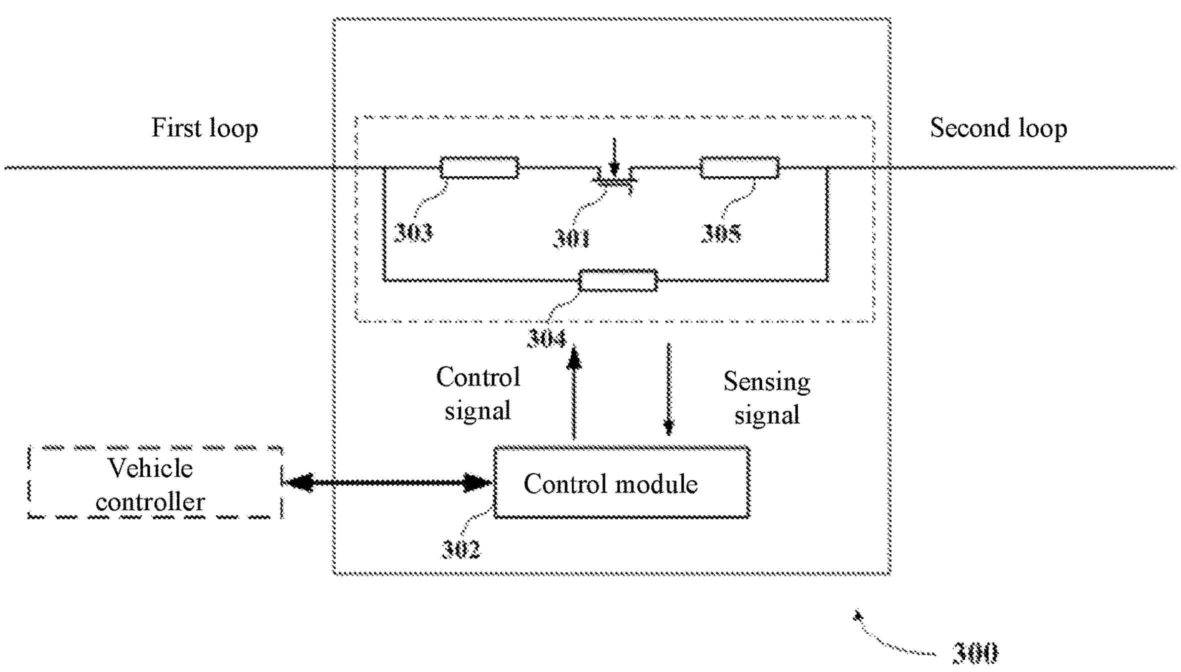
FIG. 2 is a schematic structural diagram of a switch unit according to an embodiment of the present disclosure.

FIG. 1 is a schematic structural diagram of the power supply system 10 according to an embodiment of the present disclosure. As shown in FIG. 1, the power supply system 10 may include a first loop 100, a second loop 200, and a switch unit 300. The first loop 100 may include a DC-DC conversion module 101 connected in parallel to a first load 102. A first terminal of each of the DC-DC conversion module 101 and the first load 102 that are connected in parallel is grounded. The second loop 200 may include a storage battery 201 connected in parallel to a second load 202. A first terminal of each of the storage battery 201 and the second load 202 that are connected in parallel is grounded. Further, FIG. 2 is a schematic structural diagram of the switch unit 300 according to an embodiment of the present disclosure. As shown in FIG. 2, the switch unit 300 may include a switch 301. The switch 301 is coupled between a second terminal of each of the DC-DC conversion module 101 and the first load 102 and a second terminal of each of the storage battery 201 and the second load 202. The switch 301 is in an on-state by default.

In an exemplary case, the first load 102 may include a primary load (for example, a driving-related load), and the second load 202 may include a safety load (such as an electronic stability control ESC (Electronic Stability Control) system, and electric power steering EPS (Electric Power Steering)). In this case, the first load 102 may optionally include an autonomous driving unit.

In an exemplary case, the second load 202 is a redundancy of part of the first load 102, that is, the first load 102 not only includes the second load 202, but also includes some other loads that are related to driving and other than the second load 202.

In an exemplary case, an input terminal of the DC-DC conversion module 101 may be connected to a power battery of a vehicle. The power battery is a high-voltage battery, and its voltage may be 380 volts. An output voltage of the DC-DC conversion module 101 may range from 10 volts to 20 volts; optionally 12 volts, 15 volts, or the like may be selected. Thus, the DC-DC conversion module 101 may convert a high voltage direct current into a low voltage direct current, to provide power for the first loop 100.

When the two loops of the power supply system 10 are working normally, the switch 301 in the switch unit 300 is in an on-state by default. When the switch 301 is turned on, the first load 102 and the second load 202 may be powered by the storage battery 201 to start the vehicle. After the vehicle is started, the power battery connected to the input terminal of the DC-DC conversion module 101 starts to work. In this case, a voltage of the output terminal of the DC-DC conversion module 101 is greater than a voltage of the storage battery 201. Thus, the output terminal of the DC-DC conversion module 101 may supply power for the first load 102 and the second load 202. In addition, if a capacity of the storage battery 201 does not reach the maximum in this case, the output terminal of the DC-DC conversion module 101 may also charge the storage battery 201. The arrows in FIG. 1 show a schematic diagram of a current flow generated after the power battery starts to work.

When the first loop 100 in the power supply system 10 fails, the switch 301 in the switch unit 300 is turned off. In this case, the second loop 200 continues to work normally, that is, to ensure that the second load 202 coupled to the storage battery 201 works normally (for example, normal operation of the safety load causes the vehicle to perform an emergency safety operation, such as reducing a driving speed, emergency actuation, or pulling over). When the second loop 200 in the power supply system 10 fails, the switch 301 in the switch unit 300 is turned off. In this case, the first loop 100 continues to work normally, that is, the first load 102 coupled to the DC-DC conversion module 101 works normally (for example, the driving-related load is functioning properly, that is, the vehicle is driving normally).

When the vehicle is in an automatic driving mode, regardless of failure of the first loop 100 or the second loop 200, the vehicle exits the automatic driving mode. Furthermore, when the first loop 100 or the second loop 200 fails, that is, when the switch 301 is turned off, the vehicle is not allowed to enter the automatic driving mode. After the switch 301 is turned on again, the vehicle is allowed to enter the automatic driving mode.

The power supply system 10 implements a dual-circuit structure using only one storage battery. In the power supply system 10, when one loop fails, the other loop can be used to supply power, so that the vehicle can continue to drive or perform a corresponding emergency operation, significantly improving vehicle safety. In the power supply system 10, the switch 301 is in an on-state by default, so that the vehicle can be started by using the storage battery 201 in the second loop 200 as a starting power supply.

Such a design is implemented by improving an original vehicle single power supply system, without adding additional storage battery or another component, so that no additional costs is added, and a structure is simple. In addition, such a design does not have an impact on a weight and the like of the vehicle, or cause a problem such as subsequent vehicle tuning.

According to some embodiments of the present disclosure, optionally, the switch unit 300 may further include a control module 302 and a sensor. The control module 302 may be configured to: in response to receiving a sensing signal from the sensor, send a control signal to the switch 301.

The control module 302 is coupled to the sensor to enable signal (such as a current signal, a voltage signal, and a control signal) transfer. The control module 302 may receive the sensing signal from the sensor in real time or periodically (for example, every 5 seconds, 10 seconds, or 30 seconds). The control module 302 may send a control signal to the switch 301 if it is determined that the sensing signal received from the sensor satisfies a specific condition.

The sensor may detect various parameters in the power supply system 10. The control module 302 may control a switch in the switch unit 300 based on the sensing signal, to cope with various cases that may occur when the first loop 100 or the second loop 200 in the power supply system 10 fails.

Figure 3:
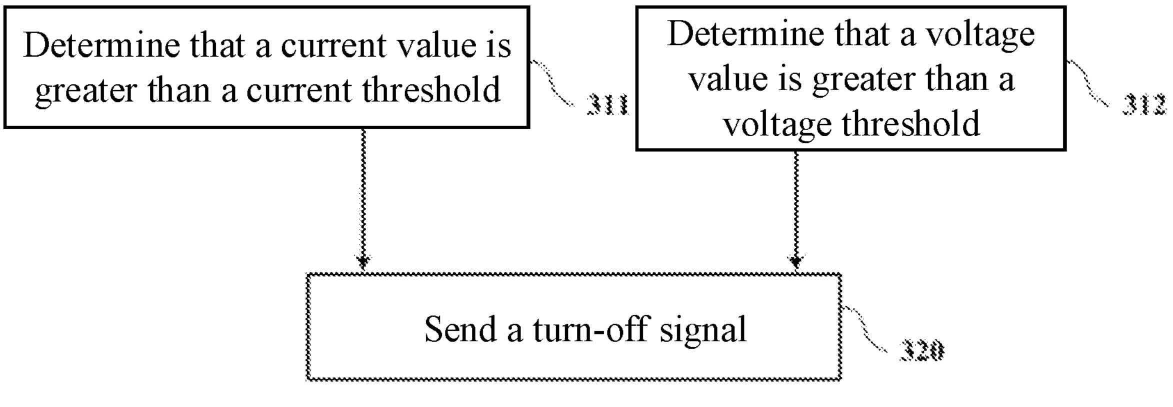
FIG. 3 is a flowchart for a control module according to an embodiment of the present disclosure.

According to some embodiments of the present disclosure, optionally, referring to FIG. 2 and FIG. 3, the sensor may include a current sensor 303, where the current sensor 303 is coupled in series to the switch 301. The control module 302 may be configured to: receive a current value from the current sensor 303, and in response to determining that the received current value is greater than a current threshold, send a turn-off signal to the switch 301 to cause the switch 301 to be turned off.

The current sensor 303 is coupled in series with the switch 301. Although FIG. 2 shows that the current sensor 303 is coupled in series between the first loop 100 and the switch 301, those skilled in the art will appreciate that the current sensor 303 may alternatively be coupled in series between the switch 301 and the second loop 200.

The current sensor 303 may measure a current value flowing between the first loop 100 and the second loop 200, so as to detect an operating state of the first loop 100 and the second loop 200. In an optional case, the current sensor 303 may measure the current value flowing between the first loop 100 and the second loop 200 in real time. The control module 302 may receive a current value from the current sensor 303 in real time or periodically (for example, every 5 seconds, 10 seconds, or 30 seconds).

The control module 302 may determine the operating state of the two loops in the power supply system 10 based on the current value between the first loop 100 and the second loop 200 measured by the current sensor 303, and control the switch 301 to be turned off in a case of determining that the current value is greater than the current threshold, so that one circuit in the power supply system 10 can continue to work normally. The current threshold may be determined based on a vehicle model. For example, the current threshold may be set to ranging from 110% to 150% of a rated operating current, optionally 120%, 130%, or the like. For example, when the rated operating current is 200 amps, the current threshold may be 240 amps, 260 amps, or the like. For example, the control module 302 may send a turn-off signal to the switch 301 to turn off the switch 301 upon determining that the current value received from the current sensor 303 is greater than 260 amps. In addition, the control module 302 may send a turn-on signal to the switch 301 to turn on the switch 301 upon determining that the current value received from the current sensor 303 is less than 260 amps.

According to some embodiments of the present disclosure, optionally, referring to FIG. 2 and FIG. 3, the sensor may include a voltage sensor 304, and the voltage sensor 304 is coupled in parallel with the switch 301. The control module 302 may be configured to: receive a voltage value from the voltage sensor 304, and in response to determining that the received voltage value is greater than a voltage threshold, send a turn-off signal to the switch 301 to cause the switch 301 to be turned off.

The voltage sensor 304 is coupled in parallel with the switch 301. Although FIG. 2 shows that one end of the voltage sensor 304 is coupled between the first loop 100 and the current sensor 303, those skilled in the art will appreciate that the current sensor 303 may alternatively be coupled in series between the current sensor 303 and the switch 301. The same goes for the other end of the voltage sensor 304.

The voltage sensor 304 may measure a voltage value across the switch 301 (namely, between the first loop 100 and the second loop 200), so as to detect an operating state of the first loop 100 and the second loop 200. In an optional case, the voltage sensor 304 may measure the voltage value across the switch 301 in real time. The control module 302 may receive a voltage value from the voltage sensor 304 in real time or periodically (for example, every 5 seconds, 10 seconds, or 30 seconds).

The control module 302 may determine the operating state of the two loops in the power supply system 10 based on the voltage value across the first loop 100 and the second loop 200 measured by the voltage sensor 304, and control the switch 301 to be turned off in a case of determining that an absolute value of the voltage value is greater than the voltage threshold (for example, the first loop is operating normally while the second loop is undervoltage, or the second loop is operating normally while the first loop is undervoltage), so that one circuit in the power supply system 10 can work normally. The voltage threshold may be determined based on a vehicle model. For example, the voltage threshold may be set to ranging from 30% to 70% of an absolute value of a rated voltage, optionally 50%, 60%, or the like. For example, when the rated current is 12 volts, the voltage threshold may be 6 volts or the like. For example, the control module 302 may send a turn-off signal to the switch 301 to turn off the switch 301 upon determining that the voltage value received from the voltage sensor 304 is greater than 6 volts. In addition, the control module 302 may send a turn-on signal to the switch 301 to turn on the switch 301 upon determining that an abstract value of the voltage value received from the voltage sensor 304 is less than 6 volts.

In some embodiments of the present disclosure, optionally, the switch unit may further includes a timer (not shown), and the timer is coupled to the control module 302. The control module 302 may be further configured to start the timer upon determining that the received voltage value is greater than the voltage threshold. When the control module 302 determines that the received voltage value is greater than the voltage threshold for a duration that is greater than a duration threshold, a turn-off signal is sent to the switch 301 to cause the switch 301 to be turned off. When the control module 302 determines that the received voltage value is greater than the voltage threshold for a duration that is less than the duration threshold, no processing is performed.

The timer may be started when the voltage value is greater than the voltage threshold to determine the duration for which the voltage value is greater than the voltage threshold. When the duration is greater than the duration threshold, the control module 302 may send the turn-off signal to the switch 301 to cause the switch 301 to be turned off. When the voltage value has recovered to be less than the voltage threshold before the duration threshold expires, no processing is performed. The duration threshold may range from 0.5 seconds to 2.5 seconds, which may be determined based on a vehicle model.

During vehicle operation, a high-power device may be suddenly turned on, which may momentarily pull down the voltage value. When the high-power device starts normally, the voltage recovers. The timer can prevent the switch 301 from being turned off due to a sudden change of voltage caused when the high-power device suddenly starts. In this case, turn-off of the switch is not necessary. In addition, turn-off of the switch may also affect normal start-up of the high-power device. The timer can avoid these cases.

Figure 5:
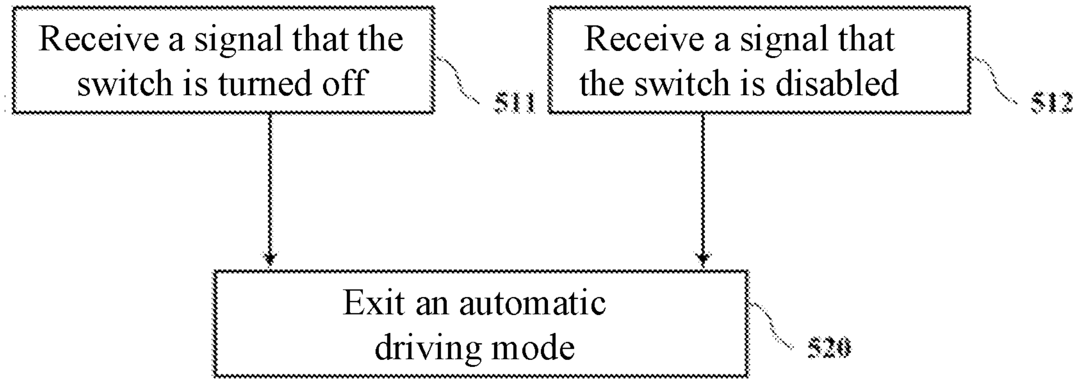
FIG. 5 is a flowchart for a vehicle controller according to an embodiment of the present disclosure.

According to some embodiments of the present disclosure, optionally, referring to FIG. 2 and FIG. 5, the control module 302 may be configured to: after sending the turn-off signal to the switch 301, report to a vehicle controller that the switch is turned off.

After the vehicle controller receives the report that the switch is turned off, if the vehicle is in the automatic driving mode, the vehicle exits the automatic driving mode. When the first loop 100 fails, the switch 301 is turned off, the second loop 200 continues to work normally, and the vehicle can complete an emergency safety operation (such as reducing a driving speed, emergency actuation, or pulling over) with the help of the storage battery 201 in the second loop 200. In an optional case, when the first loop 100 fails, the switch 301 is turned off and the storage battery 201 can support the vehicle in completing the emergency safety operation within a period of time (for example, within 3 minutes). When the second loop 200 fails, the switch 301 is turned off, the first loop 100 continues to work normally, and the vehicle can continue to drive by means of the power battery and the DC-DC conversion module 101. When the vehicle continues to drive when the switch 301 is turned off, the vehicle controller may restrict the vehicle to entering the automatic driving mode, so as to prevent the vehicle from entering the automatic driving mode when the switch 301 is turned off, thereby avoiding possible dangers. The vehicle controller may allow the vehicle to enter the automatic driving mode after receiving a report that the switch is turned on.

According to some embodiments of the present disclosure, optionally, referring to FIG. 2, the switch unit 300 may include a temperature sensor 305, where the temperature sensor 305 is coupled in series with the switch 301. The control module 302 may be further configured to: receive a temperature value from the temperature sensor 305, and determine that the switch unit 300 (for example, the switch 301) is disabled in response to determining that the received temperature value is greater than a temperature threshold.

The temperature sensor 305 is coupled in series with the switch 301, and may measure the temperature value of the switch unit 300 (or the switch 301) for detecting a state of the switch unit 300 (or the switch 301). Although FIG. 2 shows that the temperature sensor 305 is coupled in series between the switch 301 and the second loop 200, those skilled in the art will appreciate that the temperature sensor 305 may alternatively be coupled in series between the first loop 100 and the switch 301. It should be noted that the present disclosure does not limit positions of the switch 301, the current sensor 303, or the temperature sensor 305, and the three devices may be connected in series between the first loop 100 and the second loop 200 in any order. In an optional case, the temperature sensor 305 is disposed next to the switch to accurately detect a temperature of the switch.

The control module 302 may receive a temperature value from the temperature sensor 305 in real time or periodically (for example, every 5 seconds, 10 seconds, or 30 seconds). The control module 302 may determine, based on the temperature of the switch unit (or the switch) measured by the temperature sensor 305, whether the state of the switch is a normal state or a failure state. The temperature threshold may be determined based on a vehicle model. For example, the voltage threshold may be set to ranging from 40° C. to 80° C., optionally 50° C., 60° C., or the like. For example, the control module 302 may determine that the switch unit 300 (for example, the switch 301) is disabled upon determining that the temperature value received from the temperature sensor 305 is greater than 60° C. In addition, the control module 302 may determine that the switch is active upon determining that the temperature value received from the temperature sensor 305 is less than 60° C.

According to some embodiments of the present disclosure, optionally, referring to FIG. 2, the control module 302 may be configured to: after determining a signal that the switch unit 300 (for example, the switch 301) is turned off, report to the vehicle controller that the switch unit 300 (for example, the switch 301) is disabled.

After the vehicle controller receives a report that the switch is disabled, if the vehicle is in the automatic driving mode, the vehicle exits the automatic driving mode; if the vehicle is not in the automatic driving mode, the vehicle controller may restrict the vehicle to entering the automatic driving mode, so as to prevent the vehicle from entering the automatic driving mode when the switch is disabled, thereby avoiding possible dangers. The vehicle controller may allow the vehicle to enter the automatic driving mode after receiving a report that the switch is active.

The control module 302 may report to the vehicle controller whether the switch is disabled, so that the vehicle controller can perform a corresponding operation based on the report.

Optionally, the control module 302 may report a state of the switch and/or a state of the power supply system to the vehicle controller, so that the vehicle controller can perform a corresponding operation based on the report.

According to some embodiments of the present disclosure, the present disclosure provides an electric vehicle, which may include the power supply system in the foregoing embodiments.

According to some embodiments of the present disclosure, optionally, the electric vehicle may include a vehicle controller, and the vehicle controller may be configured to exit an automatic driving mode in response to receiving, from a control module 302, a signal that a switch is turned off or a signal that a switch is disabled, as shown in FIG. 5.

After the vehicle controller receives the report that the switch is turned off, if the vehicle is in the automatic driving mode, the vehicle exits the automatic driving mode. When a first loop 100 fails, a switch 301 is turned off, a second loop 200 continues to work normally, and the vehicle can complete an emergency safety operation (such as reducing a driving speed, emergency actuation, or pulling over) with the help of a storage battery 201 in the second loop. In an optional case, when the first loop 100 fails, the switch 301 is turned off and the storage battery 201 can support the vehicle in completing the emergency safety operation within a period of time (for example, within 3 minutes). When the second loop 200 fails, the switch 301 is turned off, the first loop 100 continues to work normally, and the vehicle can continue to drive by means of the power battery and the DC-DC conversion module 101. When the vehicle continues to drive when the switch 301 is turned off, the vehicle controller may restrict the vehicle to entering the automatic driving mode, so as to prevent the vehicle from entering the automatic driving mode when the switch 301 is turned off, thereby avoiding possible dangers. The vehicle controller may allow the vehicle to enter the automatic driving mode after receiving a report that the switch is turned on.

After the vehicle controller receives a report that the switch is disabled, if the vehicle is in the automatic driving mode, the vehicle exits the automatic driving mode; if the vehicle is not in the automatic driving mode, the vehicle controller may restrict the vehicle to entering the automatic driving mode, so as to prevent the vehicle from entering the automatic driving mode when the switch is disabled, thereby avoiding possible dangers. The vehicle controller may allow the vehicle to enter the automatic driving mode after receiving a report that the switch is active.

The vehicle controller may obtain a switch status signal from the control module 302, and perform a corresponding operation based on the switch status signal to ensure safety of vehicle driving.

Optional Embodiment 1

According to some embodiments of the present disclosure, referring to FIG. 1 and FIG. 2, the present disclosure provides a power supply system 10. The power supply system 10 includes a first loop 100, a second loop 200, and a switch unit 300.

The first loop 100 may include a DC-DC conversion module 101 connected in parallel to a first load 102. A first terminal of each of the DC-DC conversion module 101 and the first load 102 that are connected in parallel is grounded.

The second loop 200 may include a storage battery 201 connected in parallel to a second load 202. A first terminal of each of the storage battery 201 and the second load 202 that are connected in parallel is grounded.

The switch unit 300 includes a switch 301 and a control module 302, where the switch 301 is coupled between the first loop 100 and the second loop 200. The control module 302 is coupled with the switch 301 to control turn-on or turn-off of the switch 301. The switch unit 300 may further include a current sensor 303, a voltage sensor 304, and/or a temperature sensor 305. The switch unit 300 may further include a current sensor 303, a voltage sensor 304, and/or a temperature sensor 305. The current sensor 303 and/or the temperature sensor 305 may be coupled between the first loop 100 and the second loop 200 and connected in series with the switch 301. Although FIG. 2 shows that the current sensor 303 is coupled in series between the first loop 100 and the switch 301, and the temperature sensor 305 is coupled in series between the switch 301 and the second loop 200, those skilled in the art will appreciate that the temperature sensor 305 may alternatively be coupled in series between the first loop 100 and the switch 301, and the current sensor 303 may alternatively be coupled in series between the switch 301 and the second loop 200. In other words, the present disclosure does not limit positions of the switch 301, the current sensor 303, or the temperature sensor 305, and the three devices may be connected in series between the first loop 100 and the second loop 200 in any order. Optionally, the temperature sensor 305 may be disposed next to the switch. The voltage sensor 304 may be coupled across the switch 301 in parallel. Alternatively, the voltage sensor 304 may be coupled in parallel with the switch, and/or at least one of the current sensor 303 and the temperature sensor 305. The control module 302 may be coupled with the current sensor 303, the voltage sensor 304, and/or the temperature sensor 305 to implement communication of a signal (such as a sensing signal, or a control signal) with these sensors.

In some cases, referring to FIG. 3, the control module 302 may be configured to: in response to determining that a current value received from the current sensor 303 is greater than a current threshold (for example, 260 amps), or in response to determining that an abstract value of a voltage value received from the voltage sensor 304 is greater than a voltage threshold (for example, 6 volts), send a turn-off signal to the switch 301 to cause the switch 301 to be turned off. In addition, the control module 302 may be configured to: in response to determining that the current value received from the current sensor 303 is less than the current threshold (for example, 260 amps), or in response to determining that the abstract value of the voltage value received from the voltage sensor 304 is less than the voltage threshold (for example, 6 volts), send a turn-on signal to the switch 301 to cause the switch 301 to be turned on.

Figure 4:
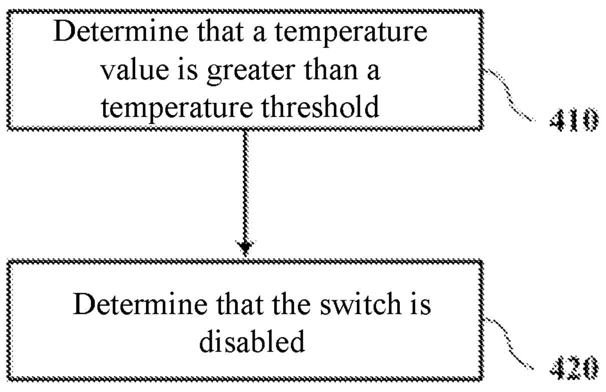
FIG. 4 is another flowchart for the control module according to an embodiment of the present disclosure.

In some cases, referring to FIG. 4, for example, the control module 302 may be configured to: in response to determining that a temperature value received from the temperature sensor 305 is greater than a temperature threshold (for example, 60° C.), determine that the switch unit 300 (for example, the switch 301) is disabled. In addition, the control module 302 may be configured to: in response to determining that the temperature value received from the temperature sensor 305 is less than the temperature threshold (for example, 60° C.), determine that the switch unit 300 (for example, the switch 301) is active.

In an optional case, after the switch 301 is turned off, the control module 302 may send the turn-on signal to the switch 301 in a case of detecting that the current value is less than the current threshold, the absolute value of the voltage value is less than the voltage threshold, and the temperature value is less than the temperature threshold, so as to turn on the switch 301.

Optional Embodiment 2

According to some embodiments of the present disclosure, the present disclosure provides an electric vehicle, which may include the power supply system in the foregoing embodiments. The electric vehicle may optionally include a vehicle controller.

In some cases, referring to FIG. 5, after the vehicle controller receives the report that the switch is turned off, if the vehicle is in the automatic driving mode, the vehicle exits the automatic driving mode. When a first loop 100 fails, a switch 301 is turned off, a second loop 200 continues to work normally, and the vehicle can complete an emergency safety operation (such as reducing a driving speed, emergency actuation, or pulling over) with the help of a storage battery 201 in the second loop. In an optional case, when the first loop 100 fails, the switch 301 is turned off and the storage battery 201 can support the vehicle in completing the emergency safety operation within a period of time (for example, within 3 minutes). When the second loop 200 fails, the switch 301 is turned off, the first loop 100 continues to work normally, and the vehicle can continue to drive by means of a power battery and a DC-DC conversion module. When the vehicle continues to drive when the switch 301 is turned off, the vehicle controller may restrict the vehicle to entering the automatic driving mode, so as to prevent the vehicle from entering the automatic driving mode when the switch 301 is turned off, thereby avoiding possible dangers. The vehicle controller may allow the vehicle to enter the automatic driving mode after receiving a report that the switch is turned on.

In some cases, after the vehicle controller receives a report that the switch is disabled, if the vehicle is in the automatic driving mode, the vehicle exits the automatic driving mode; if the vehicle is not in the automatic driving mode, the vehicle controller may restrict the vehicle to entering the automatic driving mode, so as to prevent the vehicle from entering the automatic driving mode when the switch is disabled, thereby avoiding possible dangers. The vehicle controller may allow the vehicle to enter the automatic driving mode after receiving a report that the switch is active.

In an optional case, after the switch 301 is turned off, the control module 302 may allow the vehicle to enter the automatic driving mode after receiving a report that the switch is turned on and receiving the report that the switch is active.

The "range" disclosed in the present disclosure is defined in the form of lower and upper limits, with a given range being defined by selection of a lower limit and an upper limit. The selected lower limit and upper limit define a boundary of a particular range. Ranges defined in this manner may or may not include an end value, and may be arbitrarily combined, that is, any lower limit may be combined with any upper limit to form a range. In the present disclosure, unless otherwise stated, a numerical range "a-b" represents an abbreviated representation of any combination of real numbers between a and b, where both a and b are real numbers.

In the present disclosure, unless otherwise specified, all implementations and preferred implementations in the present disclosure may be combined with each other to form a new technical solution.

In the present disclosure, unless otherwise specified, all technical features and preferred technical features in the present disclosure may be combined with each other to form a new technical solution. Although the present disclosure has been described with reference to the optional embodiments, various modifications may be made to the present disclosure and components therein may be replaced with equivalents without departing from the scope of the present disclosure. In particular, as long as there is no structural conflict, the various technical features in the embodiments may be combined in any manner. The present disclosure is not limited to the specific embodiments disclosed in the specification, but includes all technical solutions falling within the scope of the claims.

What is claimed is:

1. A power supply system, comprising:

a first loop, wherein the first loop comprises a DC-DC conversion module connected in parallel to a first load, each first terminal of the DC-DC conversion module and the first load that are connected in parallel is grounded, and the first loop does not contain storage battery;

a second loop, wherein the second loop comprises a storage battery connected in parallel to a second load, and each first terminal of the storage battery and the second load that are connected in parallel is grounded; and a switch unit, wherein the switch unit comprises a switch, the switch is coupled in series between a second terminal of each of the DC-DC conversion module and the first load and a second terminal of each of the storage battery and the second load, and the switch is in an on-state by default.

2. The power supply system according to claim 1, wherein the switch unit further comprises a control module and a sensor, and the control module is configured to: in respond to receiving a sensing signal from the sensor, send a control signal to the switch.

3. The power supply system according to claim 2, wherein the sensor comprises a current sensor, and the current sensor is coupled in series to the switch; and the control module is further configured to: receive a current value from the current sensor, and send a turn-off signal to the switch in response to determining that the received current value is greater than a current threshold.

4. The power supply system according to claim 2, wherein the sensor comprises a voltage sensor, and the voltage sensor is coupled in parallel to the switch; and the control module is further configured to: receive a voltage value from the voltage sensor, and send a turn-off signal to the switch in response to determining that the received voltage value is greater than a voltage threshold.

5. The power supply system according to claim 4, wherein the switch unit further comprises a timer, and the timer is coupled to the control module;

the control module is further configured to start the timer upon determining that the received voltage value is greater than the voltage threshold;

when the control module determines that the received voltage value is greater than the voltage threshold for a duration that is greater than a duration threshold, a turn-off signal is sent to the switch; and when the control module determines that the received voltage value is greater than the voltage threshold for a duration that is less than the duration threshold, no processing is performed.

6. The power supply system according to claim 3, wherein the control module is further configured to: after sending the turn-off signal to the switch, report to a vehicle controller that the switch is in an off-state.

7. The power supply system according to claim 2, wherein the sensor comprises a temperature sensor, and the temperature sensor is coupled in series to the switch; and the control module is further configured to: receive a temperature value from the temperature sensor, and determine that the switch is disabled in response to determining that the received temperature value is greater than a temperature threshold.

8. The power supply system according to claim 7, wherein the control module is further configured to: after determining that the switch is disabled, report to a vehicle controller that the switch is disabled.

9. An electric vehicle, comprising the power supply system according to claim 1.

10. The electric vehicle according to claim 9, wherein the electric vehicle comprises a vehicle controller, and the vehicle controller is configured to exit an automatic driving mode in response to receiving, from a control module, a signal that the switch is turned off or a signal that the switch is disabled.

11. A power supply system, comprising:

a first loop, wherein the first loop comprises a DC-DC conversion module connected in parallel to a first load, and each first terminal of the DC-DC conversion module and the first load that are connected in parallel is grounded;

a second loop, wherein the second loop comprises a storage battery connected in parallel to a second load, and each first terminal of the storage battery and the second load that are connected in parallel is grounded; and a switch unit, wherein the switch unit comprises:

a switch coupled in series between a second terminal of each of the DC-DC conversion module and the first load and a second terminal of each of the storage battery and the second load, the switch being in an on-state by default;

a sensor comprising a voltage sensor coupled in parallel to the switch; and a control module configured to receive a voltage value from the voltage sensor, and send a turn-off signal to the switch in response to determining that the received voltage value is greater than a voltage threshold.

12. An electric vehicle, comprising:

a power supply system, comprising:

a first loop, wherein the first loop comprises a DC-DC conversion module connected in parallel to a first load, and each first terminal of the DC-DC conversion module and the first load that are connected in parallel is grounded;

a second loop, wherein the second loop comprises a storage battery connected in parallel to a second load, and each first terminal of the storage battery and the second load that are connected in parallel is grounded; and a switch unit, wherein the switch unit comprises a switch, the switch is coupled in series between a second terminal of each of the DC-DC conversion module and the first load and a second terminal of each of the storage battery and the second load, and the switch is in an on-state by default; and a vehicle controller configured to exit an automatic driving mode in response to receiving, from a control module, a signal that the switch is turned off or a signal that the switch is disabled.

* * * * *